United States Patent [19]
Menchhofer

[11] Patent Number: 5,401,445
[45] Date of Patent: Mar. 28, 1995

[54] FLUID CASTING OF PARTICLE-BASED ARTICLES

[75] Inventor: Paul Menchhofer, Oak Ridge, Tenn.

[73] Assignee: Martin Marietta Energy Systems, Inc., Oak Ridge, Tenn.

[21] Appl. No.: 83,964

[22] Filed: Jun. 25, 1993

[51] Int. Cl.⁶ ............................................... B29B 9/16
[52] U.S. Cl. ....................................... 264/13; 264/63; 264/125
[58] Field of Search ................ 264/13, 14, 126, 63, 264/125

[56] References Cited

U.S. PATENT DOCUMENTS

| | | | |
|---|---|---|---|
| 2,929,106 | 3/1960 | Snow | 264/14 |
| 3,210,443 | 10/1965 | Reddie et al. | 264/14 |
| 3,423,358 | 1/1969 | Burke, Jr. | 260/41 |
| 3,432,579 | 3/1969 | Zavasnik | 264/14 |
| 3,651,182 | 3/1972 | Rosenthal | 264/14 |
| 3,933,955 | 1/1976 | Lysher | 264/14 |
| 4,104,340 | 8/1978 | Ward | 264/14 |
| 4,124,535 | 11/1978 | Farrington et al. | 264/14 |
| 4,132,564 | 1/1979 | Burke, Jr. | 106/308 |
| 4,422,985 | 12/1983 | Morishita et al. | 264/14 |
| 4,894,194 | 1/1990 | Janney | 264/109 |
| 4,906,424 | 3/1990 | Hughes et al. | 264/63 |
| 5,028,362 | 7/1991 | Janney | 264/25 |
| 5,212,143 | 5/1993 | Torobin | 264/43 |

OTHER PUBLICATIONS

Albert C. Young, Ogbemi O. Omatete, Mark A. Janney & Paul A. Menchhofer "Gelcasting of Alumina" Journal of the American Ceramic Society, vol. 74, No. 3, Mar., 1991.

F. M. Cullen, C. A. Joseph and K. A. Snyder "Forming Precision Shapes from Powdered Materials" IBM Technical Disclosure Bulletin, vol. 14, No. 10, Mar., 1972.

*Primary Examiner*—Allan R. Kuhns
*Attorney, Agent, or Firm*—Robert O. Fox; Mark S. Graham; Joseph A. Marasco

[57] ABSTRACT

A method for the production of articles made of a particle-based material; e.g., ceramics and sintered metals. In accordance with one aspect of the invention, a thermally settable slurry containing a relatively high concentration of the particles is introduced into an immiscible, heated fluid. The slurry sets or hardens into a shape determined by the physical characteristics of the fluid and the manner of introduction of the slurry into the fluid. For example, the slurry is pulse injected into the fluid to provide spherical articles. The hardened spheres may then be sintered to consolidate the particles and provide a high density product.

14 Claims, 1 Drawing Sheet

FLUID CASTING OF PARTICLE-BASED ARTICLES

The United States Government has rights in this invention pursuant to blanket license agreement No. DE ACO5-84OR21400 awarded -by united states Department of Energy Contract with Martin Marietta Energy Systems, Inc.

TECHNICAL FIELD

This invention relates generally to articles produced from powders and processes for producing articles from powders. More particularly, this invention relates to a process for producing articles made by sintering particles in a desired form.

Background of the Invention

Conventional methods for producing particle-based materials involve forming powders into various shapes and firing the bodies at a sufficiently high temperature (sintering) to cause the particles to consolidate into a high density solid. One such method comprises sintering the powder in a rigid mold to form a blank of consolidated material and machining the blank into a component of the desired shape. This method is disadvantageous in that machining and shaping are very time consuming skill-intensive processes, and therefore relatively expensive. Furthermore, this method is not well-suited to the manufacture of certain objects such as spheres and other articles, especially where a high degree of symmetry and/or high quality surface characteristics are desired.

SUMMARY OF THE INVENTION

Accordingly it is an object of the present invention to provide a method for the production of materials made from powders such as sintered ceramics and the like.

Another object of the present invention to provide a method for transforming an essentially liquid slurry having a relatively high solids content into a desired shape by introducing the slurry into a fluid which yields to formably support the slurry in the desired shape.

It is another object of the present invention to provide a method for producing materials in the shape of spheres and other substantially symmetrical articles.

A further object of the present invention is to provide a method of the character described for producing articles of desired shapes which are substantially self-supporting in the green or as-cast state prior to any drying or heating.

An additional object of the present invention is to provide a method of the character described wherein the articles are formed without the need for a solid or rigid forming medium.

Still another object of the present invention is to provide a method of the character described which enables production of articles which heretofore have been difficult to make with known production techniques.

An additional object of the present invention is to provide a method of the character described which is cost effective and uncomplicated.

Having regard to the foregoing and other objects, the present invention is directed to a process for the production of articles of a desired shape from a particle-based material. According to the invention, a thermally settable slurry containing a relatively high concentration of ceramic particles is introduced, such as by pulse-injection, into a fluid which yields to formably support the slurry in the desired shape. The slurry is supported in the fluid by the fluid in the desired shape for a time and a temperature sufficient to cause the slurry to set in the desired shape as a substantially self-supporting solid.

Preferably, the fluid is substantially immiscible to limit dissolution of the slurry components into the fluid. Accordingly, the term "immiscible" will be understood to mean that the slurry does not dissolve to a significant degree within the fluid over the time period necessary for the slurry to set into the desired shape.

A preferred embodiment of the invention relates to the production of ceramic spheres through consolidation of ceramic particles or powders set in a spherical shape by the process of the invention. Spheres produced in accordance with the present invention are particularly suitable for use as ball bearings, milling media and refractory beads due to their symmetry, surface smoothness and high strength. The ceramic particles are incorporated into a thermally settable slurry in a relatively high concentration such that the resulting green sphere readily achieves a high density solid article of the desired shape when sintered. Manufacture of such articles in accordance with the invention is advantageous over previous methods in that there is no need for solid or rigid molds, which typically impart mold imperfections to the article molded therein.

BRIEF DESCRIPTION OF THE FIGURE

The figure is a schematic of the fluid casting apparatus used in forming particle-based articles.

DETAILED DESCRIPTION OF A PREFERRED EMBODIMENT

Figure 1:
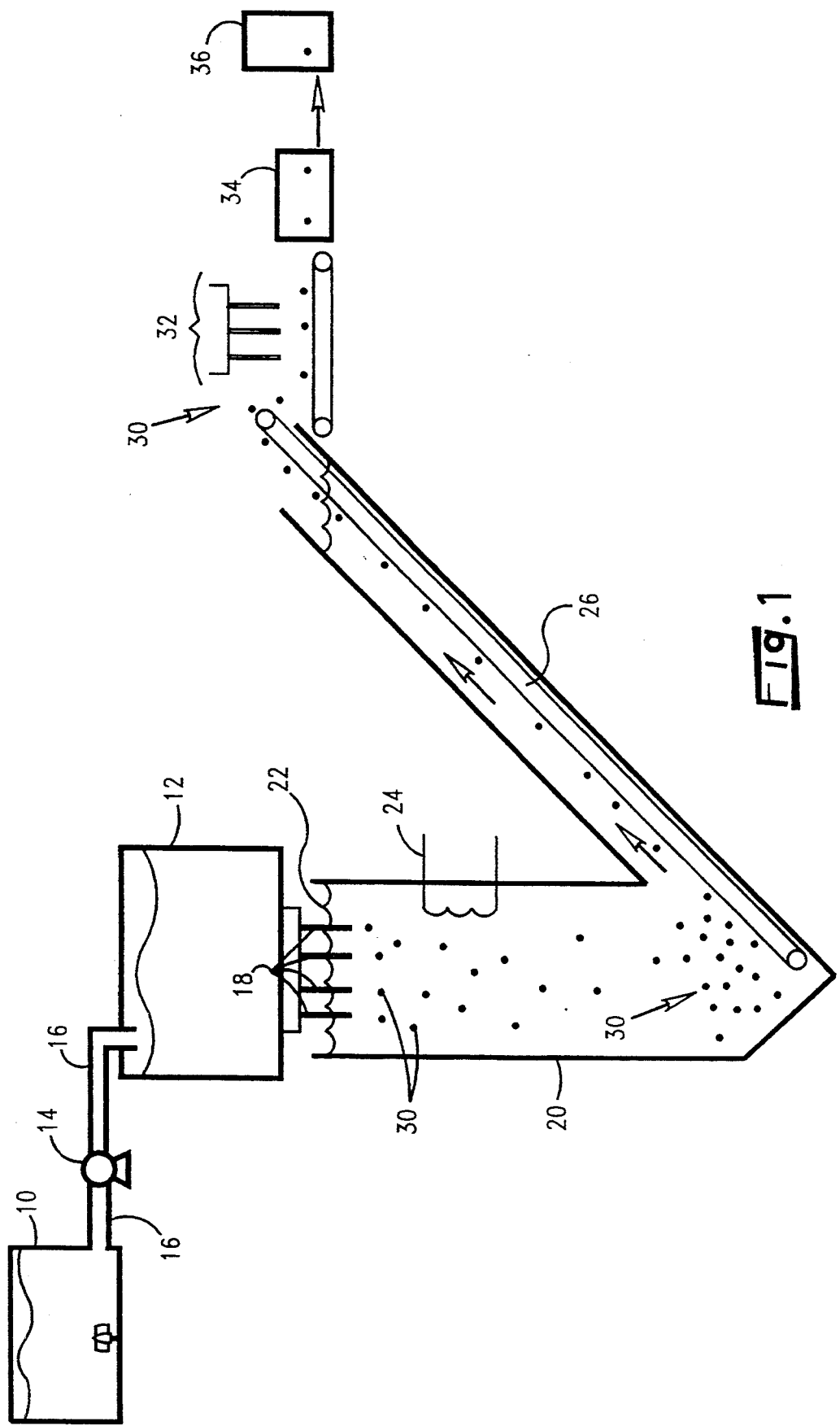

The above and other features and advantages of the present invention will become further known from the following detailed description when considered in conjunction with the accompanying drawing, which is a block diagram illustrating steps in a process for the production of sintered particle-based articles in accordance with the present invention.

As used herein, the term "sintering" and "sintered" are understood to refer broadly to processes of producing articles by consolidation or integration of essentially discrete ceramic particles by intense pressure and/or heat; and to articles produced by such processes. The conditions of sintering are well-known to those of ordinary skill in the art.

In the practice of the invention, a preferred starting material for producing the articles is a relatively low viscosity slurry including a relatively high concentration of powders or particles such as a ceramic powder, a dispersant for the powder, and a solvent containing one or more monomers (binders) which crosslink under the influence of an initiator and the application of heat to form a polymer gel matrix which binds the powder particles together into a solid green body. Optionally, the slurry may further include a catalyst to expedite the crosslinking reaction.

It is noted that the invention will be described in the context of a preferred embodiment involving the production of ceramic spheres by injecting a slurry containing a ceramic powder or particles into a high viscosity immiscible oil. However, it is believed that the invention finds application generally to the production of articles of a variety of shapes and dimensions produced from particles and powders of various sorts such as, for example, glass powder used to make fritted glass and metal powders used to make sintered metal articles. Articles of various shapes may be produced by varying the mode of introducing the slurry into the yieldable medium, the composition of the slurry and the composition of the yieldable medium.

In the context of the invention, it will be understood that the term "heat" is a relative term in that solidification or gelation of the slurry may be accomplished under various thermal environments (i.e. typically between about 0° C. and 100° C. or higher) depending on the slurry composition, especially the amount of initiator and catalyst in the slurry.

In addition, it will be understood that the yieldable fluid, while described in the context of a high viscosity oil, may be provided by low viscosity fluids and other mediums such as gels, foams, gases and other resiliently compressible fluids which yieldably resist displacement by the introduction of the slurry therein and exert a force upon the slurry to cause the slurry to conform to a particular shape depending on the manner of introduction of the slurry, the characteristics of the slurry and the characteristic of the yieldable medium. Thus, the slurry may be formed into shapes other than spherical shapes (e.g. elongate string or rod-shapes or flattened or ribbon shapes) and the selection of a medium and manner of introduction is therefore understood to be selected in light of the physical characteristics of a particular slurry and the desired shape of the cast article.

The slurry is prepared in a mixing tank indicated at 10 and is then conveyed to a tank 12, preferably a refrigerated tank (0° C. to 20° C.), by a pump 14 and conduit 16. Slurry from the tank 12 is introduced in a desired manner, such as by injectors 18, into a suitable reaction vessel 20 containing a yieldable substantially immiscible fluid 2 having the aforementioned characteristics. The vessel 20 includes a temperature controller 24, such as a heater, for maintaining the fluid 22 at a temperature sufficient to cause rapid polymerization and cross-linking reactions so that the slurry solidifies into a substantially self-supporting solid shortly after introduction into the fluid and usually as soon as the sphere has achieved equilibrium.

For the production of spherical or generally sphere-shaped articles, the slurry is preferably pulse-injected into the fluid 22 in the vessel 20 in predetermined, discrete volumes according to the size of the sphere to be produced. Thus, the injectors 18 of FIG. 1 are shown having their outlets located below the surface of the fluid 22 whereupon the fluid immediately exerts a substantially uniform pressure on the exterior surface of the material to support the material in a desired shape, yieldably displacing to receive the material therein. It will be seen that the fluid therefore formably supports the material injected into the fluid as in a spherical shape to facilitate setting of the material in the desired shape. Alternatively, the injectors may be above the surface of the fluid and the slurry may be dripped, sprayed or otherwise introduced into the fluid to promote the formation of slurry droplets if spherical articles are to be produced. The rate of injection of the slurry via the injectors 18 is preferably selected such that any motion or other turbulence imparted to the fluid during introduction of the fluid is dampened before introduction of the next volume of slurry unless the slurry is introduced or injected continuously.

The fluid 22 is maintained at a temperature which is sufficient to cause the monomer solution to rapidly set (through polymerization and cross-linking) and bind the particles into an essentially solid self-supporting form having the desired shape. The temperature at which the medium is maintained is a function of the slurry system. For the ceramic slurry, this is generally between about 0° C. and 100° C., and preferably is about 80° C.

The produced articles, in this case spheres 30, settle to the bottom of the vessel 20 under the influence of gravity. The settling rate is dependent upon the densities of the slurry and the fluid 22. The settled articles may be collected from the bottom of the vessel, as by conveyor 26 and cleaned to remove any residual oil by spraying with a suitable solvent as at 32, for example a citrus solvent sold under the tradename North Woods Trapper and available from Superior Chemical Corporation of Cheboyan, Wis. The collected and cleaned articles are substantially solid, green articles and may be further consolidated by heating and/or pressure, as at 34, and then subjected to further finishing treatment, such as by introduction into a tumbler or polisher 36.

As mentioned above, the fluid 22 is preferably maintained at a temperature sufficient to cause the monomer solution to rapidly set. In relation to a preferred slurry for use in the invention, the term "rapidly" refers to setting of the slurry within a few seconds. This "rapid" setting of the slurry is believed to result, in part, from the superior heat transfer characteristics achieved when the yieldable medium is selected to be a liquid, such as hydrocarbon and silicone oils. However, it is well within the scope of the invention to provide for a setting time of 30 minutes or more, such as when the fluid is maintained at a relatively low temperature or if only a relatively small amount of initiator is used.

The set time is not believed to be critical and it will be understood that, for a given powder, the achievement of solidification is a function of the composition and concentration of the monomer solution and initiator, the volume of slurry introduced into the fluid, the presence and amount of catalyst in the slurry, the temperature of the fluid, the viscosity of the fluid and other factors. In addition, during pulse-injection of slurry to form spheres, it has been observed that the slurry forms into a spherical shape almost immediately upon introduction into the fluid, yet, depending on the slurry composition, the slurry may not set for at least several minutes. Accordingly, it will be appreciated that the yieldably displaceable fluid, depending on its composition, aids significantly in supporting the slurry in the desired shape until the slurry sets.

The use of a slurry which contains a high powder content is preferred in the invention (e.g., 50–60 volume %). By employing such a high powder content, the powder particles are closely aligned such that the cast product is of near net final shape and dimensions, and any shrinkage or warpage experienced during drying is minimized. In addition, the closely packed particles are bound by the cross-linked and polymerized monomers such that the cast article is quite strong and is an essentially self-supporting solid. This enables the product to substantially retain the desired configuration without external support and to substantially retain the desired cross-sectional configuration after subsequent heating and/or sintering steps to remove the solvent and polymerized monomers and to further consolidate or sinter the particles, as at 30.

As mentioned above, the oil may be cleaned from the green product with a suitable solvent and the clean, green product may be heated to substantially remove the water or other solvent and provide a dried product. Although the specific temperature and time necessary for drying the product depends on the composition of the slurry and other factors, adequate drying generally may be achieved by slowly heating the green product in a controlled humidity environment from room temperature to about 120° C. The polymerized monomer(s) may be substantially removed from the product by further heating at higher temperatures, for example, from about 300° C. to about 600° C., over a suitable period of time to effect removal.

Finally, the product may be sintered to consolidate the particles and form a high density body. The various sintering temperatures and conditions for ceramic powders are well known in the art. Substantial removal of polymer components may be accomplished as a low-temperature step during the sintering process. That is, the processes of drying, monomer removal and sintering may be sequential stages of a continuous heating process wherein the final state of the product is achieved.

Ceramic powders suitable for use in the present invention include, but are not limited to, alumina, fused silica, magnesia, zirconia, spinels, mullite, tungsten carbide, silicon carbide, boron nitride, silicon nitride and mixtures thereof.

In a preferred embodiment, the powder is mixed with a dispersant compatible with the powder and a monomer solution to form a thermally settable slurry mixture having a relatively high concentration of powder particles, as described in U.S. Pat. Nos. 5,028,362 and 4,894,194 to Janney, the disclosures of which are incorporated herein by reference. The monomer solution provides a low viscosity vehicle for the ceramic powder in a high solids concentration. Additionally, when heated, the monomer solution polymerizes and cross-links to provide a firm, strong polymer-solvent gel matrix with the powder dispersed therein. The resultant "green" product exhibits exceptionally high strength and good particle homogeneity.

Various dispersants for powders are known in the art and are appropriate for use in the present invention. Care should be exercised, however, in order to select a dispersant which does not interact in an undesirable manner with the components of the monomer solution, particularly the initiator or the solvent. A particular dispersant may be evaluated for suitability with a particular powder and a particular monomer solution by mixing small amounts of the respective components and judging the flow properties of the resultant mixture, whether the resultant mixture exhibits a notable and repeatable yield point, and/or whether the mixture is dilatant.

Preferred dispersants for ceramic powders in water include acrylic and methacrylic acid salts. Preferred dispersants for ceramic powders in an organic solvent includes ethoxylated alkylphenol dispersants. Generally, the dispersant is used in a small amount, by volume, as compared with the amount of the powder included in the mixture. As an example, an ethoxylated alkylphenol dispersant may be used for an $Al_2O_3$/water system in an amount ranging from about 0.02 to about 0.04 volume percent.

The monomer solution which is mixed with the ceramic powder and the dispersant to form the slurry preferably includes at least one monofunctional monomer, at least one difunctional monomer, a free-radical initiator compound and a solvent. Generally, the monofunctional monomer includes one functional group such as a vinyl or allyl group and the difunctional monomer includes two such groups.

Generally, the amount of monomer included in the monomer solution determines the degree of hardness of the resulting product. In general, green ceramic products of suitable rigidity may be formed using no more than about 20 volume percent monomers in the solution, and in a preferred embodiment, the solution comprises from about 5 to about 20 volume percent monomer. The monomer solution may comprise from about 35 to about 60 volume percent of the slurry.

The use of an aqueous solvent is preferred in the process of the present invention when introducing the slurry into a high viscosity oil, since oil and water are substantially immiscible. An immiscible fluid is preferred, since the surface tension provided at the interface between the fluid and the slurry is believed to encourage coalescence of the slurry into a generally spherical shape. However, in some cases, such as when the powder reacts undesireably with water, specific monomers and initiators are chosen which are compatible with an organic solvent, it being understood that the use of an organic solvent may be appropriate particularly if the fluid into which the slurry is introduced is immiscible with the solvent. The organic solvent substituted for the water in this process may comprise any organic solvent that will dissolve or disperse the multifunctional monomers, not adversely affect the setting of the resulting slurry, and which exhibits a relatively low vapor pressure and relatively low viscosity at the temperature at which the multi-functional monomer polymerizes and crosslinks.

The monomer solution may further comprise a free-radical initiator compound for initiating the polymerization and cross-linking of the monomer when the slurry mixture is heated. Various thermally activated free-radical initiator compounds are known in the polymer art and are suitable for use in the method of the present invention. Preferred free radical initiator compounds for use with ceramic powders include ammonium persulfate and potassium persulfate. The preferred free-radical initiator is generally inactive at the expected storage temperature so that the shelf-life of the monomer solution is relatively long. However, once the slurry mixture containing the monomer solution is heated to the desired setting temperature, the initiator compound aids in achieving a relatively high reaction rate whereby polymerization and crosslinking of the monomers is easily and quickly achieved.

The amount of initiator included in the monomer solution is generally small as compared with the amount of monomer included in accordance with conventional polymerization methods . A preferred catalyst is N, N, $N^1$ $N^1$—tetramethylene diamine (TEMED) available from Malinkrodt, Inc., Paris, Ky. By controlling the initiator to monomer ratio, the temperature of the fluid and the slurry, the residence time in the fluid (i.e. the viscosity of the fluid) and the presence and amount of catalyst, a cast body can be made to polymerize at temperatures ranging from about 0° to about 95° C. in order to develop optimum properties in the green body.

As mentioned previously, the non-solid, yieldable medium may be provided by various mediums such as gels, foams and gases. The term "non-solid" is understood to refer generally to mass systems which exhibit fluid-like characteristics, but does not limit the class of suitable materials to fluids. For example, certain solids-containing systems having multiple small-particle solids may exhibit fluid-like characteristics in that they readily yield their shape to receive slurry injected therein and enable the slurry to form into a desired shape. In this regard, it will be understood that the non-solid, yieldable medium receives the introduced slurry and preferably offers at least some resistance to travel of the slurry therethrough so that the slurry conforms to a shape commensurate with the resistance provided by the medium. This promotes, in the case of the described ceramic spheres, formation of the slurry into a shape having improved symmetry and surface characteristics.

A preferred medium for use in the casting of the described ceramic spheres is a high-viscosity mixed hydrocarbon mineral oil known as Standard N450000 available from Cannon Instrument Company of State College, Pa. The viscosity of this hydrocarbon mineral oil is temperature dependent and ranges between about 1,676,000 cp at 25° C. and 10,930° C. at 100° C. as set forth in Table I. An oil temperature of between about 20° C. and 100° C., and most preferably about 80° C., was observed to be suitable for forming ceramic spheres.

TABLE I

| Temperatures (°C.) | Viscosity (cP) |
|---|---|
| 25 | 1,676,000 |
| 60 | 105,400 |
| 70 | 55,560 |
| 80 | 30,880 |
| 90 | 17,990 |
| 100 | 10,930 |

Volumes of slurry pulse-injected into this oil are observed to form almost immediately into substantially symmetrical, spherical shapes having good surface smoothness, as set forth in the following Example 1.

EXAMPLE 1

An aqueous suspension was prepared by mixing an alumina powder available under the trade designation RCLS-DBM from Reynolds Chemical Co., and Bauxite (Arkansas) with deionized high purity water, polymerizable monomers, a dispersant, and a sintering aid. Both a monofunctional monomer, acrylamide (AM), and a difunctional monomer, N,N'-methylene-bisacrylamide (MBAM) were used in this example. The dispersant was a 40% aqueous solution of ammonium polyacrylate available under the trade designation Darvan 821A from R. T. Vanderbilt Co., Greenwich, Conn. Magnesium oxide powder (0.05 wt % of the total solids weight) was added to the slurry as a sintering aid. A 1000 ml batch of slurry (55 volume % solids) was prepared as follows:

| a. 550 ml solids | $Al_2O_3$: | @3.97 g/ml = 2183.50 g |
|---|---|---|
|  | MgO: | 0.05 wt % = 1.09 g |
| b. 450 ml liquids | Premix "C" | 426.31 ml |
|  | Darvan 821A | 23.69 ml |
| c. Premix "C" | 7 parts aqueous solution containing 20 wt % AM | |
|  | 3 parts aqueous solution containing 2 wt % MBAM | |

The preferred order of addition is as follows. The Premix "C" solution was prepared and the dispersant added, followed by the alumina powder. A small amount of the liquid was retained for combination with the MgO powder. The MgO was mixed with this solution (1 ml dispersant: 4 ml of the premix solution) and added to the slurry while stirring.

The slurry was mixed at about 800 rpm using a Caframo RZR-2000 lab stirrer, followed by continuous mixing on a laboratory shaker for about 8 hours. After mixing, the slurry was degassed on a laboratory Roto-evaporator at about 0° for approximately 1 hour.

The initiator was a 10 wt % aqueous solution of ammonium persulfate $(NH_4)_2S_2O_8$. Prior to the beginning of a run, a series of initiator-response tests were conducted to quantify the working time at various additions of the initiator. Because there is an occasional variation in the reactivity of the initiator and monomers due to age and concentration, pre-trials were used to determine the precise initiator ratios. For the run described in this example, a ratio of 20 ml slurry: 100 $\mu$l T.E.M.E.D.: 70 $\mu$l of 10 wt % aqueous solution of initiator was determined to give the optimum degree of response for samples thermally polymerized at 80° C. Subsequent evaluation showed that lower concentrations, i.e. 20 ml slurry: 10 $\mu$l T.E.M.E.D.: 60 $\mu$l of 10 wt % aqueous solution of initiator was also suitable. After the pre-chilled initiator solution and T.E.M.E.D. catalyst was added, the slurry was mixed for an additional 5 minutes in the roto-evaporator before using. The viscosity of the solution at approximately 1° C. was not measured but was observed to be similar to the viscosity of water.

In this example, the slurry was pulse-injected using a digital pipette into a 100 ml graduated cylinder filled with Standard N450000 mixed hydrocarbon mineral oil pre-heated to 80° C. A few seconds were permitted between injections to ensure that the oil had returned to a static state and that any motion imparted to the site of introduction had ceased. The injected slurry was observed to form into a generally spherical shape immediately after introduction into the oil. The formed spheres slowly traveled under the influence of gravity to the bottom of the graduated cylinder. The time required for each sphere to settle to the bottom of the cylinder varied depending on the size of the spheres but generally ranged between about 10 and 30 minutes. The spheres were collected at the completion of the experiment, cleaned by spraying with tap water and were observed to have good symmetry, smooth surface characteristics and high green strength.

The digital pipette was an Eppendorf model 4710 and the volume of slurry injected with each injection determined the size of the sphere produced. The equation $4/3 \pi R^3$ was used to estimate the volume of slurry needed to provide spheres of a given diameter. Based on this experiment, it was determined that the following volumes of this slurry would provide spheres as follows:

| Sphere Diameter (mm) | slurry volume (microlitres) |
|---|---|
| 1 | 0.52 |
| 2 | 4.19 |
| 3 | 14.14 |
| 4 | 33.51 |
| 5 | 65.45 |
| 6 | 113.10 |
| 7 | 179.59 |
| 8 | 268.08 |
| 9 | 381.70 |
| 10 | 523.60 |

EXAMPLE 2

In this example, a low viscosity silicone based oil known as Standard 500 and available from Brookfield Engineering Laboratories, Inc. of Stoughton, Mass. was used as the yieldable medium in the casting of ceramic spheres. This oil has a viscosity of between about 460–500 cP at 25° C. and a viscosity of about 100 cP at 80° C.

As in Example 1, the prechilled T.E.M.E.D. was first mixed with the chilled, deaired slurry, followed by the initiator solution and by an additional 2 minutes of mixing on the rot-evaporator prior to using.

Volumes of slurry having a composition of 20 mls slurry:10 μl T.E.M.E.D.:70 μl 5 wt % aqueous solution $(NH_4)_2S_2O_8$ were pipetted into a graduated cylinder containing 100 ml of standard 500 warmed to 80° C. in the same manner as set forth in Example 1. This produced spheres observed to have excellent symmetry and green strength.

The present invention provides ceramic article having improved properties, particularly improved symmetry and surface characteristics. The fluid casting technique enables better control over the quality and uniformity of the articles, and is believed to improve the homogeneity of the individual articles. Ceramic articles made in accordance with the present invention are of near net final shape and are essentially self-supporting in that they are substantially rigid and are not easily warped or distorted. In addition, ceramic articles made in accordance have improved symmetry and surface characteristics, particularly as compared to articles produced using conventional molding techniques. Thus, it will be appreciated that the present invention improves over current methods because the use of molds may be avoided. This is particularly desirable, since molds typically have at least some degree of surface imperfection which are imparted to the molded article.

In addition, the process of the invention enables the production of a great number of articles, such as spheres suitable for use as ball bearings, milling media and refractory beads, within in a relatively short period of time with use of a single piece of equipment. This is advantageous over conventional techniques, since to achieve such a rate of production would require multiple molds. Accordingly, because of the relative simplicity enabled by the present invention, it will be appreciated that the present process requires minimal labor as compared with other ceramic forming techniques and allows the use of the equipment which is relatively uncomplicated and easy to use.

The foregoing description of certain embodiments of the present invention has been provided for purposes of illustration only, and it is understood that numerous modifications or alterations may be made without departing from the spirit and scope of the invention as defined in the following claims.

The embodiments described herein are the best mode known to applicant for practicing the invention, but it will be understood that other ways of producing articles according to the claims are encompassed by the invention.

What is claimed is:

1. A process for use in the production of articles of a desired shape from a particle-based material which comprises the steps of providing a thermally settable slurry having dispersed therein a relatively high concentration of the particles, a polymerizable and cross-linkable monomer, said particles being relatively inert with respect to said monomer, and a free-radical initiator compound for initiating the polymerization and cross-linking of the monomer, introducing the slurry into a displaceable fluid which yields to formably support the slurry in the desired shape and maintaining the temperature of the fluid at a temperature which is sufficient to cause heat transfer between the slurry and the fluid to initiate polymerization and cross-linking of the monomer, and coordinating maintenance of the temperature of the fluid with the introduction of the slurry into the fluid so that the slurry is maintained at the sufficient temperature for a time sufficient to enable the monomer in the slurry to polymerize and cross-link sufficiently to cause the slurry to set in the desired shape as a substantially self-supporting solid which is substantially rigid, removing the solid from the fluid, and sintering said solid.

2. The process of claim 1, wherein the fluid comprises a fluid which is immiscible with respect to the slurry.

3. The process of claim 2, wherein the immiscible fluid comprises a hydrocarbon oil.

4. The process of claim 2, wherein the immiscible fluid comprises a silicone oil.

5. The process of claim 1, wherein the slurry is pulse-injected in discrete volumes into the fluid to form each volume of the injected slurry into a substantially spherical shape.

6. The process of claim 1, further comprising heating the removed solid to substantially drive off nonparticle components of the slurry and sintering the solid to cause consolidation of particles contained therein.

7. The process of claim 1, wherein said slurry comprises a powder and a dispersant for said powder in an aqueous solution containing monomers wherein the monomers polymerize to form an essentially solid polymeric matrix supporting the particles therein as a dispersed phase.

8. The process of claim 1, further comprising the step of warming the fluid to a temperature of between about 20° C. and 100° C. prior to introducing the slurry into the fluid.

9. The process of claim 1, wherein the thermally settable slurry sets at a predetermined temperature and the temperature of the fluid is controlled to cause the slurry to set by rapidly adjusting the temperature of the slurry to the predetermined temperature upon introduction of the slurry into the fluid.

10. The process of claim 1, wherein the slurry is conveyed through the fluid by gravity after being introduced therein.

11. The process of claim 1, wherein the particles are ceramic.

12. A process for producing an essentially self-supporting solid article from a thermally settable slurry having at least one cross-linkable monomer, a free-radical initiator compound for initiating the polymerization and cross-linking of the monomer, a plurality of powder particles that are relatively inert with respect to the monomer, and a dispersant for dispersing said particles within the slurry, said method comprising the sequential steps of:

introducing a preselected volume of the slurry into a fluid filled vessel;

maintaining the temperature of the fluid at a temperature which is sufficient to cause a heat transfer between the slurry and the fluid, and coordinating maintenance of the temperature of the fluid with the introduction of the slurry into the fluid so that the slurry is maintained at the sufficient temperature for a time sufficient to enable the monomer in the slurry to polymerize and cross-link sufficiently to form a matrix while the volume of slurry is moving under the influence of gravity through the fluid such that the volume of slurry is transformed into an essentially solid cross-sectional article which is substantially rigid;

removing the solid article from the fluid;

and sintering the solid article.

13. The process of claim 12, wherein said powder particles are ceramic.

14. A process of producing an essentially solid spherical-shaped article from a slurry containing a dispersion of particles used to make the article, said method comprising the steps of:

introducing a thermally settable slurry containing the particles, a dispersant, one or more cross-linkable monomers, and a free-radical initiator compound for initiating the polymerization and cross-linking of the monomer, said particles being relatively inert with respect to the monomer, into a yieldably displaceable fluid which yields to formably support the slurry in the desired spherical shape; and maintaining the fluid at a predetermined temperature sufficient to cause a heat transfer between the slurry and the fluid produce a cross-linking reaction of the monomers and coordinating maintenance of the temperature of the fluid with the introduction of the slurry into the fluid so that the slurry is maintained at the sufficient temperature for a time sufficient to enable the monomer in the slurry to polymerize and cross-link sufficiently such that the slurry is rapidly formed into an essentially solid spherical-shaped self supporting article which is substantially rigid;

removing the solid article from the fluid; and sintering the solid article.

* * * * *